Jan. 2, 1940.  C. F. WALLACE  2,185,482
APPARATUS FOR REPRODUCING MOVEMENT
Filed Jan. 25, 1932   2 Sheets-Sheet 1
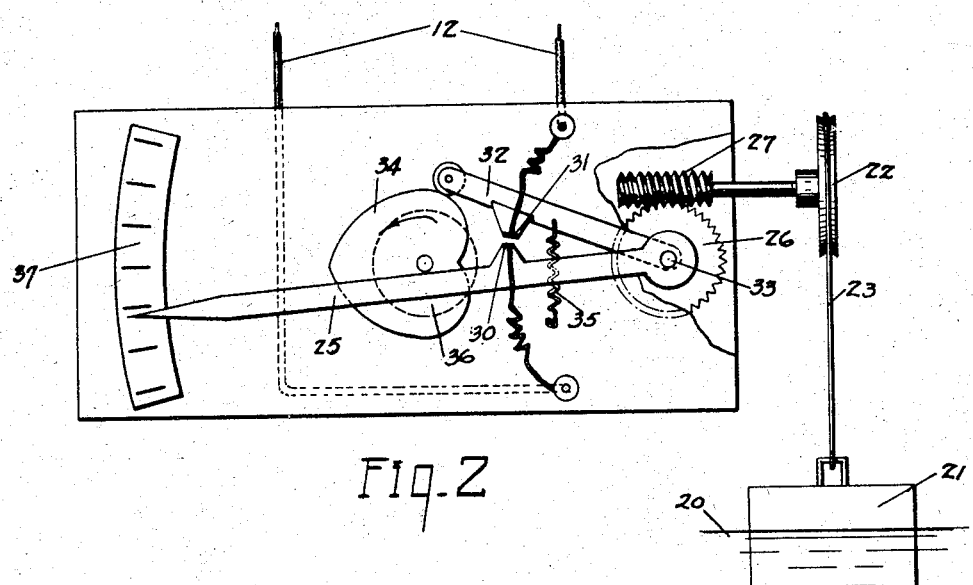
Fig. 2
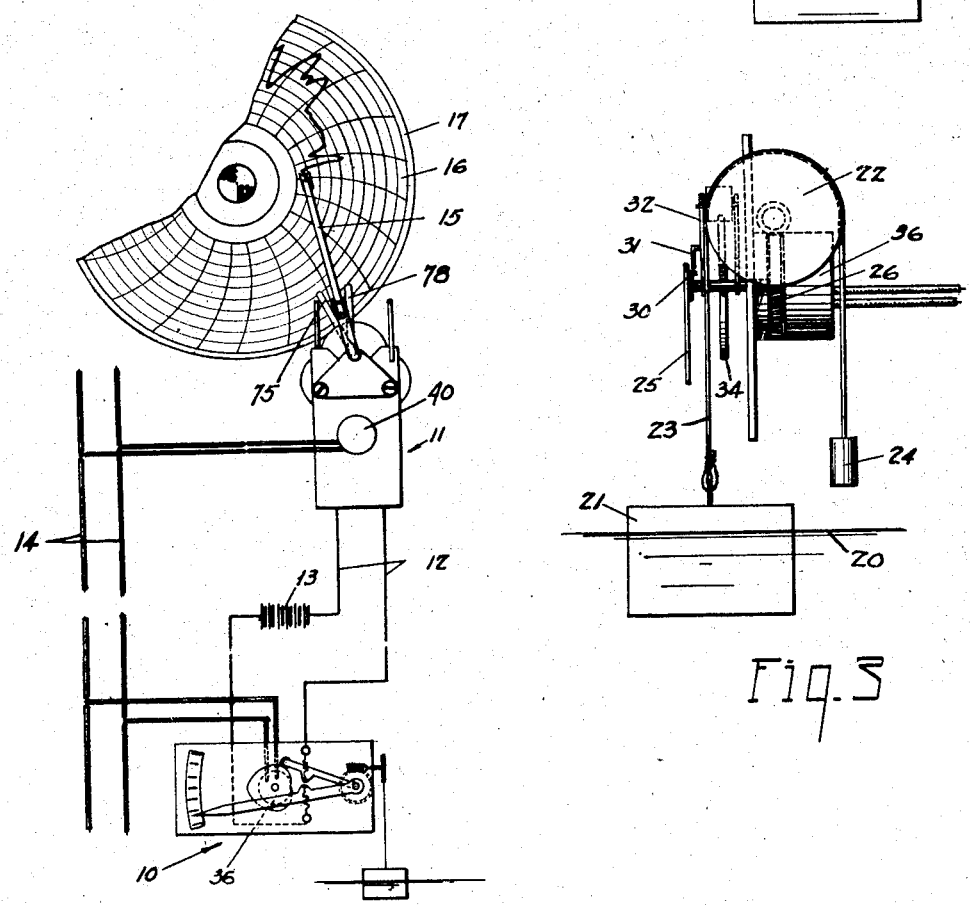
Fig. 3
Fig. 1
INVENTOR
Charles F. Wallace
BY Arthur A. Kent
his ATTORNEY Jan. 2, 1940.  C. F. WALLACE  2,185,482
APPARATUS FOR REPRODUCING MOVEMENT
Filed Jan. 25, 1932   2 Sheets-Sheet 2
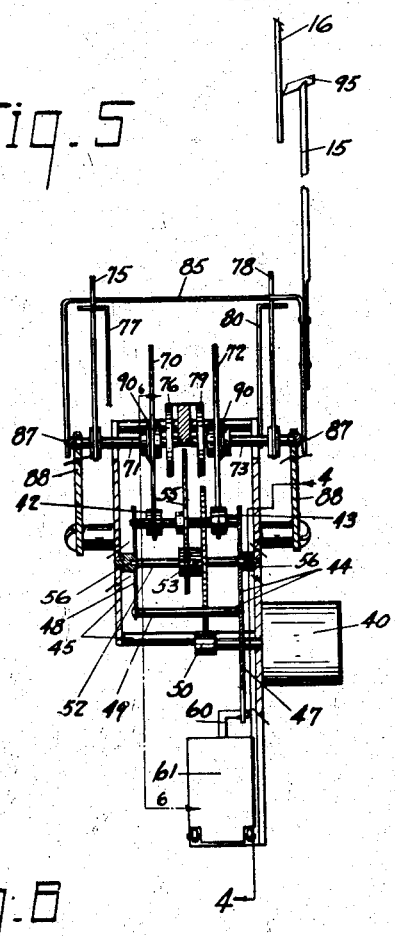
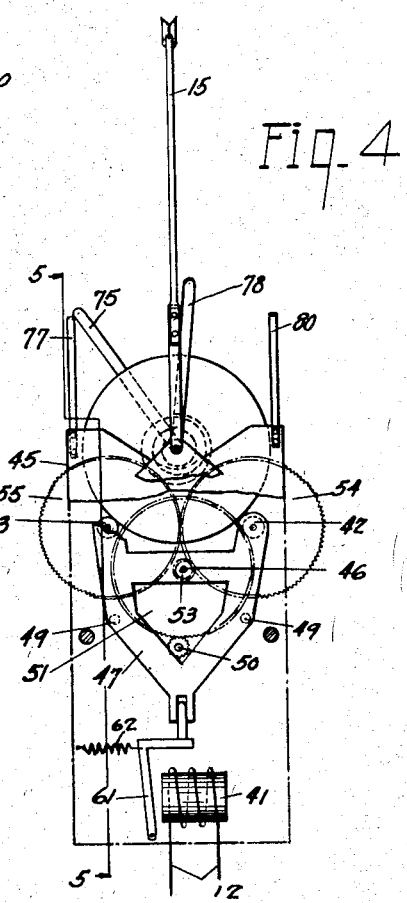
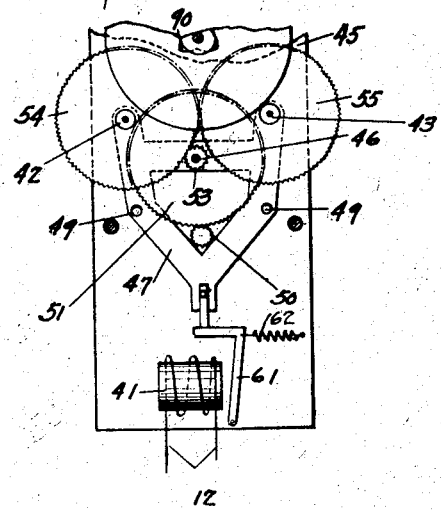
INVENTOR
Charles F. Wallace
BY
Arthur L. Kent
his ATTORNEY

Patented Jan. 2, 1940

2,185,482

UNITED STATES PATENT OFFICE 2,185,482

APPARATUS FOR REPRODUCING MOVEMENT

Charles F. Wallace, Westfield, N. J., assignor to Wallace & Tiernan Products, Inc., Belleville, N. J., a corporation of New Jersey Application January 25, 1932, Serial No. 588,595

2 Claims. (Cl. 177—351)

This invention relates to apparatus for reproducing movement proportionally at a distance, and more particularly to electrically controlled apparatus for producing movement or change in position of a member at a distant receiving station corresponding to change in position of an object at a transmitting station.

While the invention has been made primarily to provide an improved indicating instrument for visually or otherwise momentarily indicating, or for recording, water levels, pressure, differential pressure, rates of rotation and the like, its usefulness is not limited to that of an indicator or recorder, for it can also be applied to proportional feed devices and the like controlled from a more or less distant point.

The invention comprises an improved transmitting device and an improved receiving device which are connected by an electric circuit and which may be practically any distance apart. The transmitting device comprises a movable member the change in position of which is to be reproduced proportionally by the receiver, and circuit controlling means operative to close an electric circuit for a length of time which at successive operations varies proportionally with change in position of said movable member. The receiving device comprises an electro-magnetic device connected in said circuit, and means controlled by said electro-magnetic device whereby a movable member is moved to produce a record or other indication or other effect corresponding to the change in position of said movable member of the transmitter.

Most desirably, the circuit controlling means of the transmitter is motor operated to close the circuit in successive intervals of time for a proportion of each time interval which varies with change in position of the movable member whose changes in position are to be reproduced proportionally by the receiver; and the movable member of the receiving device is moved by motor operated driving means the speed of which is maintained at a fixed ratio to the speed of said motor of the transmitting device, so that when connected to the movable member of the receiver it causes said member to move at a rate having a fixed ratio to the length of said time intervals, the driving connection between said driving means and said member being controlled by the electro-magnetic device of the receiver, which, being in turn controlled in its operation by the circuit controlling means of the transmitter, causes said member of the receiver to be connected to and moved by said driving means during that portion of each of said time intervals during which the electric circuit is closed by the transmitter. Said member of the receiver is therefore in each of said successive time intervals moved from a starting position to a position corresponding to the position of the moving member of the transmitter, and the difference in length of successive movements of said member of the receiver will thus vary proportionally with the changes in position of the movable member of the transmitter. The receiver may be provided with any suitable indicating or other means operated or controlled by said moving member for showing or recording, or producing some effect corresponding to, the changes in position of the moving member of the transmitter.

Two such movable members are most desirably provided each adapted to be moved by the motor operated driving means of the receiver alternately in opposite directions in the same path, one of said members being connected to the driving means when the electro-magnetic device is energized and the other being connected to the driving means when the electro-magnetic device is de-energized, the starting positions, or positions of rest, of said members being at opposite ends of their path of movement and each being moved by the driving means in the direction toward the position of rest of the other one, and being returned to its position of rest after each such movement. A third movable member, which may be, and for convenience will be, referred to as the indicating member, is mounted between the first two members for movement in a parallel path so as to be engaged and moved by said members, and it is frictionally mounted so as to stay in any position to which it is moved until it is again moved by one or the other of said two movable members. The distance between the positions of rest of the two movable members is such that the movement of either of said members if continued during the whole of one of said time intervals would move the indicating member into engagement with the other movable member in its position of rest. In each time interval, however, the electro-magnetic device is energized for a part of the time interval corresponding to the position of the movable member of the transmitter so that the driving means of the receiver is alternately connected to drive first one and then the other of said two movable members of the receiver. Thus, so long as the movable member of the transmitter remains stationary, the movement given to each of said two movable members of the receiver will be a distance equal to the distance which it mould move in one of said time intervals less the distance through which the other of said members is moved; and the indicating member of the receiver will be maintained in a position in which each of said movable members alternately moves just into contact with it and then returns to its position of rest. This position of the indicating member will correspond to the position of the movable member of the transmitter. When any movement of the movable member of the transmitter occurs, resulting in an increase in the length of time during which the electric circuit connecting the receiver with the transmitter is closed in each time interval, one of said two movable members of the receiver will be given a greater movement and the other of said two movable members will be given a lesser movement, thus causing a movement of the indicating member of the receiver to a new position corresponding to the changed position of the movable member of the transmitter. Likewise, movement of the transmitter member in the other direction will result in a corresponding movement of the indicating member. The movements, or changes in position, of the movable member of the transmitter will thus be reproduced proportionally in the movements of the indicating member of the receiver, and said indicating member will at all times show or record, or produce an effect corresponding to, the position of the movable member of the transmitter.

It is desirable that the circuit closing device of the transmitter and the driving means of the receiver be driven at constant speed, as by suitable constant speed motors, such as suitable electric or spring motors, but it is not necessary that the speed of these motors be maintained constant. What is necessary is that the speed ratio of the two motors and of the parts driven thereby be maintained constant. The speed of either may vary without affecting the accuracy of the indications or other proportional effect produced by the receiver so long as the speed of the other varies proportionally so as to maintain the speed ratio between the two constant. I prefer to use synchronous motors supplied from the same alternating current circuit. The apparatus will then be accurate regardless of whether or not there is a variation in frequency in the current supply of such motors.

Change in the controlling condition, such as water level, pressure, rotation rate, rate of feed, etc., at the transmitting station may be translated by any suitable means into movement or change in position of the movable member of the transmitting device. The third movable member of the receiver, referred to as the indicating member, may serve as an indicating pointer, or as a pen arm for a recording device, or its movement may be utilized for producing some other effect corresponding to changes in position of the movable member of the transmitter and, therefore, to changes in the controlling condition at the transmitting station.

While the improved transmitting and receiving devices are especially adapted to be used together in a complete system, a receiving device according to the invention may be used with any other suitable transmitting device wherein the length of electric contact or other change in the connecting electric circuit in successive uniform intervals of time is proportional to the movement which it is desired to reproduce; and similarly, a transmitting device embodying novel features of the invention may be used with other forms of receiving devices.

While apparatus according to the invention is primarily intended and especially useful for reproducing movement, or change in position, proportionally, and does so operate when the transmitter is operated to make its circuit closing contacts in successive intervals of time and the receiver has two oppositely moving members for positioning an indicating or effect-producing movable member which remains stationary between successive positioning movements resulting from the circuit closing and opening operations of the transmitter, yet apparatus embodying certain features of the invention may operate so as to be in effect merely a position or condition reproducing or indicating apparatus as distinguished from a movement reproducing, or change in position or condition reproducing, apparatus. If, for example, the transmitter is caused to operate when desired or intermittently at comparatively long intervals to make at each operation a single circuit closing contact of a length corresponding to the position of its movable member, and the receiver has only the one movable member which is moved when the electro-magnetic device is energized, and if before each such operation of the transmitter the indicating member of the receiver has been set at a zero position or other position away from that corresponding to the position of the movable member of the transmitter, then the result of the operation will be to set the indicating member of the receiver in position to indicate the position of the movable member of the transmitter, and this operation might be repeated from time to time.

With a transmitter such as shown, in which the circuit is controlled by the action of a cam and the closing of the circuit for successive closed circuit periods of varying length does not occur at the same successive positions of the cam, and with a receiver having two positioning members which make reciprocal movements during the closed circuit and open circuit portions respectively of each time period, it is necessary that the operation of the transmitter be continuous, the time intervals being directly successive one after another, not spaced as they might otherwise be.

A full understanding of the invention can best be given by a detailed description of an apparatus embodying the various features of the invention in an approved form, and such a description will now be given in connection with the accompanying drawings which show an apparatus for making a permanent indication or record of the varying surface level of a body of water. In said drawings:

Fig. 1 is a view showing in elevation the transmitting and receiving devices of such apparatus;

Fig. 2 is a view on a larger scale of the transmitting apparatus shown in Fig. 1;

Fig. 3 is an end view of the transmitting apparatus looking from the right of Fig. 1;

Fig. 4 is a view of the receiving device looking from the right of Fig. 5 and partly in section on line 4—4 of Fig. 5;

Fig. 5 is a side view of the receiving apparatus partly in section on line 5—5 of Fig. 4; and Fig. 6 is a view of parts of the receiving device looking from the left of Fig. 5 and sectioned on line 6—6 of Fig. 5.

Referring to the drawings, the complete apparatus as shown in Fig. 1 comprises a transmitting device 10 and a receiving device 11 connected by an electric circuit 12 supplied with current from any suitable source such as a battery 13. The receiving device has an indicating member 15 in the form of a pen arm which serves as an indicating pointer and also to make a record mark on a record disk 16 carried by suitable support 17, which, when the apparatus is in operation, is slowly rotated at a predetermined constant rate by any suitable clock mechanism as customary in recording devices of this general kind.

The transmitting device is located adjacent to the surface of a body of water, the changes in level of which are to be transmitted to and indicated by the receiving device. The body of water is indicated at 20. A float 21, floating at the surface of the water, is suspended from a sheave 22 by means of a flexible cable 23, which, as shown, passes over the sheave and carries at its other end a counterbalancing weight 24. As the float rises or falls, the sheave is caused to rotate in one direction or the other an amount which varies proportionately to the rise or fall of the float, and therefore to the change in water level. The rotary motion of the sheave is transmitted by suitable gearing to a lever arm 25 so that the arm moves up and down proportionally to variation in the water level, this gearing as shown comprising a worm wheel 26 fast on the shaft of the arm 25 and a worm 27 on the shaft of the sheave meshing with the worm wheel.

The arm 25 carries a contact 30 which is periodically engaged by a movable contact 31 carried by an arm 32 pivotally mounted to swing on an axis 33 of the arm 25. The free end of the arm 32 is moved up and down in regular cycles by a motor driven cam 34 against which an antifriction roller on the end of the arm 32 normally rests under the weight of the arm and tension of a spring 35. The cam 34 is most desirably heart shaped so that during one half of each revolution of the cam the arm 32 is raised at a constant angular velocity and during the other half of each revolution of the cam the arm is lowered at the same constant angular velocity, except so far as the movement of the arm may be limited by engagement of the contact 31 with the contact 30.

The contacts 30 and 31 are connected in the electric circuit 12 which extends to the receiving device, and this circuit is thus closed once during each successive time interval in which the cam 34 makes one complete revolution, for a length of time or portion of such time interval which is determined by the position of the arm 25 and its contact 30. Each downward movement of the arm 32 continues until its contact 31 comes into engagement with the contact 30. Then during further rotation of the cam the arm 32 remains stationary and the circuit closing contact continues until the cam again comes into engagement with the roller on the end of the arm 32 and moves the arm upward and the contact 31 away from the contact 30, thereby breaking the circuit. The length of time that the circuit is closed during each revolution will thus depend on the speed of revolution of the cam and the position of the arm 25. The speed of the cam being constant, if the arm 25 is moved upward, the length of contact will be proportionately increased, and if the arm 25 is moved downward, the length of contact will be proportionately decreased. The length of time during which the circuit is closed in each of said time intervals will thus vary proportionately with change in position of the arm 25 and therefore with change in position of the float 21 and therefore with change in the water level. If the speed of rotation of the cam should vary so as to cause a variation in the length of successive time intervals, then although the variation in the length of successive closed circuit periods due to change in position of the arm 25 will not be exactly proportionate to such changes in position of the arm, nevertheless, the part or proportion of successive time intervals during which the circuit is closed will still vary proportionately to changes in position of the arm. The cam 34 is most desirably driven at a constant speed by any suitable actuating device or motor 36 such as a clock motor or a synchronous electric motor.

A scale 37 is desirably provided with which the end of the arm 25 cooperates as a pointer for showing the water level. This scale is principally useful in the calibration of a particular transmitting device with a particular receiver.

Referring now to the receiving device as shown best in Figs. 4, 5 and 6, the operative parts of the receiver are driven by a motor 40 and the operation of the receiver is controlled by an electromagnetic device comprising an electro-magnet 41 connected in the circuit 12. The electro-magnetic device determines the time during which the indicator-positioning movable members of the receiver are operated in each cycle of operations, and the speed of the motor determines the rate at which said movable members are moved. The motor is most desirably a constant speed motor such as a clock motor or a synchronous electric motor as shown. It is not necessary that the speed of the motor 40 or the speed of the motor 36 of the transmitting device be constant, but if the speed of either of these motors varies, then the speed of the other must vary proportionately so that the speed ratio between the two motors is maintained constant. When synchronous motors are employed they are desirably supplied from the same alternating current circuit, as indicated in Fig. 1, so that if there is any variation in frequency in the current supplied to either motor there will be the same variation in the current supplied to the other motor, and the speed ratio of the motors will be maintained constant and the accuracy of the apparatus will not be affected.

The motor 40 of the receiver drives continuously two drive rolls 42 and 43 in opposite directions at the same speed. These drive rolls are mounted in a movable frame or cage 44 which is pivotally mounted in the main frame 45 of the receiving device to have a slight swinging movement about an axis at 46. The cage 44 comprises front and rear plates 47 and 48 connected by rods 49. Plates 47 and 48 are cut away or of skeleton form to avoid interference with other parts of the apparatus. For driving the rolls 42 and 43, the motor, through a pinion 50 on its shaft, drives a gear 51 mounted on a shaft 52, the axis of which coincides with the axis about which the cage 44 swings. The shaft 52 has a pinion 53 fast thereon which meshes with and drives a gear 54 which is fast on the shaft of the driving roll 42. This gear 54 meshes with a gear 55 of the same size fast on the shaft of the driving roll 43. The driving rolls 42 and 43 will thus be driven by the motor in opposite directions at the same speed. As shown, the front and back plates of the frame or cage 44 are carried by two shouldered blocks 56 having pivot studs extending therefrom by which they are pivotally mounted in front and back plates of the main frame 45. The shaft 52, which carries the gear 51 and pinion 53 extends into pivot recesses in said blocks 56.

The plate 47 of the cage 44 has a downwardly extending lower end which is slotted to receive an arm 60 extending from an armature 61 which is mounted to be attracted by the electro-magnet 41 and which when the magnet is deenergized is retracted to the position shown in Fig. 4 by a spring 62. When the magnet is energized the armature is attracted and moves the lower end of the cage 44 to the right in Fig. 4, thereby swinging the frame on its axis 46 to carry the driving roll 42 into engagement with the periphery of a disk 70 which is mounted on and drives a shaft 71, thereby rotating the disk and shaft in a clockwise direction as viewed in Fig. 4. When the magnet 41 is de-energized, the armature 61 is retracted by the spring 62, and this movement of the armature swings the cage 44 in the opposite direction to move the driving roll 42 out of engagement with the disk 70 and to carry the driving roll 43 into engagement with the periphery of a similar disk 72 which is mounted on and drives a shaft 73 which is co-axial with the shaft 71, thereby rotating the disk 72 in a counter-clockwise direction as viewed in Fig. 4.

The shaft 71 carries an arm 75 fast thereon and also has connected to it a light coil spring 76 which tends to turn the shaft to hold the arm 75 in a normal position of rest against an upwardly extending stop 77 and to swing the arm back to such position of rest after it has been moved therefrom. Similarly, the shaft 73 carries an arm 78 fast thereon and has connected to it a coiled spring 79 which tends to turn the shaft to hold the arm 78 against an upwardly extending stop 80 and to return the arm to its position of rest against the stop after it has been moved away therefrom. The arms 75 and 78 constitute in the construction shown the two oppositely moving movable members of the receiver before referred to.

When the magnet 41 is energized and the cage 44 is thereby shifted to bring the driving roll 42 into engagement with the disk 70, the movable member or arm 75 will thereby be moved away from its stop 77 in a clockwise direction for a distance proportional to the time during which the electro-magnet remains energized; and when the magnet is de-energized and the cage swung in the opposite direction to move the roll 42 out of engagement with the disk 70 and the roll 43 into engagement with the disk 72, the shaft 71 will be rotated in the reverse direction by the spring 76 to swing the arm 75 back to its position of rest against the stop 77, and the arm 78 will be moved away from its stop 80 in a counter-clockwise direction for a distance proportional to the time during which the magnet remains de-energized. Then when the magnet is again energized the disk 72 will be released and the spring 79 will rotate the shaft 73 to return the arm 78 to its position of rest, and the arm 75 will again be moved from its position of rest for a distance proportional to the time during which the magnet is energized; and these successive movements of the arms 75 and 78 will continue so long as the magnet is successively energized and de-energized. The driving means of the receiver, that is, the motor 40, is thus alternately connected to move first one and then the other of the arms 75 and 78.

As the circuit to the magnet 41 is controlled by the transmitting device by which the connecting circuit 12 is, during each successive time interval in which the cam 34 makes one complete rotation, closed for a length of time which varies in successive time intervals proportionately with change in position of the moving member, the arm 25, of the transmitting device, the difference in length of successive movements of the arm 75 of the receiver will vary proportionately with the changes in position of the movable member of the transmitter. As the successive lengths of time during which the circuit is open and the magnet de-energized vary inversely with variations in the length of time that the circuit is closed, the difference in length of successive movements of the arm 78 of the receiver will also vary proportionately with the changes in position of the movable member of the transmitter, but the difference in length of movement of the two positioning members 75 and 78 will be in the reverse direction, that is, as the length of movement of one member increases the movement of the other will correspondingly decrease.

The indicating or effect-producing member of the receiver in the construction shown is an indicating and record marking pen arm 15 which is carried by a U-shaped member or yoke 85 pivotally mounted to swing about the axis of the aligned shafts 71 and 73. The outer ends of the shafts 71 and 73 have their bearings in bearing blocks 87 which are set in plates 88 forming part of the main frame of the device and the outer ends of these blocks are shaped to form conical pivot points which extend into pivot openings in the arms of the yoke 85. There is sufficient spring in the yoke to produce a pinching action on the pivot points so that when the yoke and indicating arm 15 have been moved to any position they will stay in such position until force is applied to move them in one direction or the other. The intermediate or horizontal portion of the yoke 85 extends between the arms 75 and 78, which are of sufficient length so that they may come into engagement with the yoke when moved from their respective positions of rest.

The stops 77 and 80 are positioned so that the distance between the positions of rest of the arms 75 and 78 is such that the movement of either arm if continued during the whole of one cycle of operations or one complete rotation of the cam 34 would move the yoke 85 into engagement with the other arm. When, therefore, the magnet 41 is energized and the arm 75 thereby caused to be moved from its position of rest in a clockwise direction, if the yoke is in a position such that it will be engaged by the arm before the arm has completed its movement, the yoke will be moved in a clockwise direction by the arm to carry the indicating arm 15 to a position corresponding to the position of the movable member of the transmitter. Likewise, when the magnet is de-energized and the arm 78 thereby caused to be moved in a counter-clockwise direction, if the yoke is in a position to be engaged by the arm before the latter has completed its movement, it will be moved to carry the indicating arm 15 in a counter-clockwise direction to a position corresponding to the position of the movable member of the transmitter.

So long as the movable member of the transmitter remains stationary, each of the arms 75 and 78 will make a succession of equal movements, and the length of movement of each arm will be equal to the distance which it would move if connected to the driving means through the whole of one of said time intervals less the distance through which the other arm moves.

The yoke and the indicating arm 15 will then be maintained in a position in which the arms 75 and 78 alternately move just into contact with the yoke and then return to their positions of rest. This position of the yoke and of the indicating arm will then correspond to the position of the movable member of the transmitter. When, however, any movement of the movable member of the transmitter occurs resulting in an increase in the length of time during which the electric circuit is closed, the arm 75 will make a longer movement and the arm 78 a shorter movement, and the yoke and indicating arm will be moved to the right or in a clockwise direction a distance corresponding to the change in position of the movable member of the transmitter. Likewise, if the movable member of the transmitter moves in the direction to decrease the circuit closing period, the arm 75 will move a lesser and the arm 78 a greater distance and the indicating arm will be moved a distance to the left or counter-clockwise proportional to the change in position of the movable member of the transmitter. When the apparatus shown is used for indicating change in water level, the indicating arm or pointer 15 will move to the right when the water level rises and to the left when the water level drops.

There will thus be an operation of the receiving device for adjusting the position of the indicating arm 15 during each revolution of the cam 34 of the transmitting device. So long as the position of the movable member of the transmitter does not change, the indicating arm will not be moved, but whenever there is a change in position of the movable member of the transmitter between successive time intervals or revolutions of the transmitter cam, the indicating arm of the receiver will be moved for a distance proportional to, and in the direction corresponding to, the change in position of the movable member of the transmitter.

The frequency of the cycle of operations, or length of said successive time intervals, may be varied widely and may be made as desired to suit the requirements of any particular installation. I have found 10 second intervals, or 6 cycles a minute, convenient and satisfactory for an instrument such as shown for indicating changes in water level and the like. Shorter intervals or much longer intervals, such as intervals of one hour duration, might be used and be found satisfactory for some purposes. For transmitting the movement of a more or less constantly changing member, the shorter the time interval in which successive operations take place the more accurate will be the indication made by the receiver.

In order to prevent damage to the instrument through improper adjustment or failure in the periodic opening and closing of the connecting electric circuit, a friction connection is provided between the disks 70 and 72 and the respective arms 75 and 78. Such connection is provided in the construction shown by a friction connection 90 between each of the disks 70 and 72 and the shaft on which it is mounted.

In describing the transmitter, it has been referred to as operating to close the circuit 12 for a part of each time interval. It might equally be considered as operating to open the circuit for a part of each successive time interval. And in the receiver, an obvious equivalent of the particular arrangement shown would be one in which the movement and effect resulting in the arrangement shown from the closing of the circuit 12 and the energizing of the magnet 41 result from opening the circuit and de-energizing the magnet; and in which closing the circuit causes the movement and effect which in the arrangement shown results from opening the circuit. Such equivalent arrangements are therefore to be considered as covered by the claims, expressions such as "closing the circuit" being understood to cover the reverse change in the circuit or other change in condition of the circuit whereby the particular effect might be secured.

As stated, the indicating arm 15 of the receiver serves as a pen arm, being provided with a pen 95 for making a permanent indication on the record disk 16. The arm 15 and yoke 85 may be considered as a movable member to which is given a movement corresponding to movement or change in position of the movable member of the transmitter, and the movement of this member may obviously be employed for producing other effects than a mere indication or the making of a permanent indication or record. For the production of some such possible effects considerable power for moving the yoke 85 may be required.

As the power available for moving the arms 75 and 78, and thereby the yoke 85, is furnished by the motor 40 and is entirely independent of the current in the connecting circuit 12, which is controlled by the transmitter, practically any desired power available for moving the yoke may be provided merely by providing a suitable motor and making the construction of the receiving apparatus of suitable strength. In those cases where it is desired to utilize relatively large amounts of power, the friction drives between the rolls 42 and 43 and the disks 70 and 72 may be replaced by suitable gear drives, that is, the rolls and disks may be provided with suitable relatively fine gear teeth. When the frame 44 and parts carried thereby are of such weight as to require considerable power to shift the frame quickly, instead of connecting the magnet 41 directly in the circuit 12, the equivalent arrangement of a relay in the circuit 12 controlling a local circuit including the magnet 41 may obviously be employed.

Because of the small amount of power required to operate the magnet or relay, it is possible to separate the transmitter from the receiver by a very long distance and yet be able to use ordinary telephone wire for the connecting electric circuit 12. This circuit may obviously be a pair of wires or a single wire connection may be provided using the ground as a return circuit. As the parts of the receiver which move the indicating or effect producing member are driven by a separate local source of power, the accuracy of the apparatus is not affected by variations in the power controlled by the transmitter and supplied through the circuit 12 to the receiver so long as the power supplied is sufficient to operate the frame shifting magnet or relay. Instead of a single receiving device, a plurality of receiving devices may be used controlled by the same transmitter, the electro-magnetic devices of the several receivers being connected in the connecting circuit either in series or in parallel.

It is to be understood that the invention is not to be limited to the particular construction shown as an illustrative embodiment of the various features of the invention, but that it includes change and modifications thereof with the claims.

What is claimed is:

1. A receiving device of the type referred to, comprising a motor driven shaft, a shiftable frame, two driving rolls carried by said frame and driven in opposite directions from said shaft, two arms mounted co-axially to swing independently, an indicator mounted between said arms and movable about the axis of said arms, stops for said arms, springs connected one to each of said arms and urging the arm toward its stop and normally holding it in its position of rest against its stop, a part associated with one of said arms and positioned to be engaged by one of said driving rolls when said frame is shifted in one direction to move such arm in the direction toward the indicating member, a part associated with the other arm and positioned to be engaged by the other driving roll when said frame is shifted in the other direction to move such arm in the direction toward the indicating member, and electro-magnetic means for shifting said frame to cause movement of said arms alternately from their positions of rest.

2. A receiving device of the type referred to, comprising a motor driven shaft, two movable members movable in opposite directions from positions of rest, electromagnetic means, means controlled by said electromagnetic means for connecting said shaft to said movable members alternately, one during the entire time that the electromagnetic means is energized and the other during the entire time that the electromagnetic means is deenergized, to move each member a distance proportional to the time during which the shaft and member are operatively connected, means for returning each of said movable members to its position of rest upon being disconnected from said shaft, and an indicating member movable by said movable members, said means for connecting said shaft to said movable members comprising a shiftable frame shifted by said electromagnetic means, two driving rolls carried by said frame and driven in opposite directions from said shaft, a part associated with one of said movable members positioned to be engaged by one of said driving rolls when said frame is shifted in one direction and a part associated with the other movable member positioned to be engaged by the other driving roll when the frame is shifted in the other direction.

CHARLES F. WALLACE.